US010378324B2

United States Patent
Conn et al.

(10) Patent No.: US 10,378,324 B2
(45) Date of Patent: Aug. 13, 2019

(54) CONTROLLING OPERATION OF A STEAM-ASSISTED GRAVITY DRAINAGE OIL WELL SYSTEM BY ADJUSTING CONTROLS BASED ON FORECAST EMULSION PRODUCTION

(71) Applicant: International Business Machines Corporation, Armonk, NY (US)

(72) Inventors: Andrew R. Conn, Mount Vernon, NY (US); Lior Horesh, North Salem, NY (US); Matthias Kormaksson, Rio de Janeiro (BR); Moshood O. Saliu, Calgary (CA); Theodore G. van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 15/276,189

(22) Filed: Sep. 26, 2016

(65) Prior Publication Data
US 2018/0087360 A1 Mar. 29, 2018

(51) Int. Cl.
*E21B 43/24* (2006.01)
*E21B 41/00* (2006.01)
(Continued)

(52) U.S. Cl.
CPC ...... *E21B 43/2406* (2013.01); *E21B 41/0092* (2013.01); *G05B 13/0275* (2013.01);
(Continued)

(58) Field of Classification Search
CPC .......... G06N 3/04; G06N 3/08; G06N 99/005; G06F 17/11; G06F 17/12; G06F 17/16;
(Continued)

(56) References Cited

U.S. PATENT DOCUMENTS 6,257,334 B1 * 7/2001 Cyr ..................... E21B 43/2406
166/263
7,879,768 B2 2/2011 Wu
(Continued)

FOREIGN PATENT DOCUMENTS

CN 203905930 U 10/2014
WO 2016025245 2/2016

OTHER PUBLICATIONS

N.V. Queipo et al., "Surrogate Modeling-Based Optimization of SAGD Processes," Journal of Petroleum Science and Engineering, Jul. 2002, pp. 83-93, vol. 35, Nos. 1-2.
(Continued)

*Primary Examiner* — Michael Jung
(74) *Attorney, Agent, or Firm* — Vazken Alexanian; Ryan, Mason & Lewis, LLP

(57) ABSTRACT

A method for increasing efficiency in emulsion production for a steam-assisted gravity drainage (SAGD) oil well system includes generating a causal model of the SAGD oil well system and training the causal model of the SAGD oil well system utilizing historical time series data relating to one or more SAGD oil wells at one or more SAGD production sites of the SAGD oil well system. The historical time series data is obtained from a plurality of sensors in the SAGD oil well system. The method also includes utilizing the causal model to determine a forecast emulsion production and a forecast set of control parameters associated with one or more of the SAGD production sites of the SAGD oil well system. The method further includes adjusting a set of controls of the SAGD oil well system based on the forecast emulsion production and the forecast set of control parameters and subject to one or more constraints associated with the SAGD oil well system.

20 Claims, 12 Drawing Sheets

(51) Int. Cl.
*G06N 3/08* (2006.01)
*G06N 3/04* (2006.01)
*G05B 13/02* (2006.01)
*G05B 13/04* (2006.01)

(52) U.S. Cl.
CPC .............. *G05B 13/048* (2013.01); *G06N 3/04* (2013.01); *G06N 3/08* (2013.01)

(58) Field of Classification Search
CPC .............. G05B 13/0275; G05B 13/048; E21B 43/2406; E21B 41/0092
See application file for complete search history.

(56) References Cited

U.S. PATENT DOCUMENTS

| | | | |
|---|---|---|---|
| 8,146,669 | B2 | 4/2012 | Mason |
| 8,756,019 | B2 | 6/2014 | Pimenov et al. |
| 8,849,639 | B2 | 9/2014 | Brown et al. |
| 8,977,502 | B2 | 3/2015 | Liu |
| 9,043,189 | B2 | 5/2015 | Wallace et al. |
| 9,085,958 | B2 | 7/2015 | Laing et al. |
| 9,163,497 | B2 | 10/2015 | Laing et al. |
| 9,803,469 | B2* | 10/2017 | Kaiser ................ E21B 43/2406 |
| 9,964,654 | B2 | 5/2018 | Laake |
| 10,088,596 | B2 | 10/2018 | Maerten |
| 2002/0082815 | A1 | 6/2002 | Rey-Fabret et al. |
| 2006/0095872 | A1* | 5/2006 | McElvain ........... G06F 17/5077 716/113 |
| 2007/0055392 | A1 | 3/2007 | D'Amato et al. |
| 2009/0166033 | A1 | 7/2009 | Brouwer et al. |
| 2011/0060572 | A1 | 3/2011 | Brown |
| 2011/0288778 | A1* | 11/2011 | Pavlovich ........... E21B 43/2406 702/12 |
| 2011/0320047 | A1 | 12/2011 | Stone et al. |
| 2012/0024524 | A1 | 2/2012 | Marsimovich et al. |
| 2012/0059640 | A1 | 3/2012 | Roy et al. |
| 2013/0105147 | A1 | 5/2013 | Scott |
| 2013/0175030 | A1* | 7/2013 | Ige ....................... E21B 43/128 166/250.15 |
| 2013/0262061 | A1 | 10/2013 | Laake |
| 2013/0277049 | A1* | 10/2013 | Liu ..................... E21B 43/2406 166/252.1 |
| 2014/0124194 | A1 | 5/2014 | Jorshari |
| 2014/0216732 | A1 | 8/2014 | Stone et al. |
| 2014/0216739 | A1 | 8/2014 | Brown et al. |
| 2014/0278302 | A1 | 9/2014 | Ziegel et al. |
| 2014/0352966 | A1 | 12/2014 | Yuan |
| 2015/0009499 | A1 | 4/2015 | VanderHeyden et al. |
| 2015/0114633 | A1 | 4/2015 | Godfrey et al. |
| 2015/0161304 | A1 | 6/2015 | Vachon |
| 2015/0198022 | A1 | 7/2015 | Stanecki et al. |
| 2015/0354336 | A1* | 12/2015 | Maurice .............. E21B 43/2406 706/12 |
| 2016/0032692 | A1 | 2/2016 | Conn et al. |
| 2016/0054713 | A1 | 2/2016 | Foss et al. |
| 2016/0098502 | A1 | 4/2016 | Havre et al. |
| 2016/0201453 | A1* | 7/2016 | Kaiser ................ E21B 43/2406 73/152.29 |
| 2016/0245065 | A1* | 8/2016 | Gray ....................... G01V 1/303 |
| 2016/0245071 | A1 | 8/2016 | Vincelette et al. |
| 2016/0251957 | A1* | 9/2016 | McEwen-King ... E21B 43/2406 73/152.39 |
| 2016/0281497 | A1 | 9/2016 | Tilke et al. |
| 2016/0312592 | A1* | 10/2016 | Chen .................. E21B 43/2406 |
| 2016/0312599 | A1 | 10/2016 | Adam et al. |
| 2017/0045055 | A1 | 2/2017 | Hoefel et al. |
| 2017/0051597 | A1* | 2/2017 | Akiya ..................... C10G 33/04 |
| 2017/0177992 | A1* | 6/2017 | Klie ........................ E21B 43/00 |
| 2017/0336811 | A1 | 11/2017 | Stone et al. |
| 2017/0350217 | A1 | 12/2017 | Paul et al. |
| 2017/0351227 | A1 | 12/2017 | Paul et al. |
| 2018/0087371 | A1 | 3/2018 | Vincelette et al. |
| 2018/0195374 | A1 | 7/2018 | Stalder |

OTHER PUBLICATIONS

IP.com, "Methods for SAGD Optimization," IP.com No. IPCOM000213572D, Dec. 21, 2011, 10 pages.
H.X. Nguyen et al., "Experimental Design to Optimize Operating Conditions for SAGD Process," Society of Petroleum Engineers (SPE), SPE Asia Pacific Oil & Gas Conference and Exhibition, SPE 145917, Sep. 2011, 11 pages, Jakarta, Indonesia.
Dennis Denney, "Real-Time Optimization of SAGD Operations," Society of Petroleum Engineers, Journal of Petroleum Technology (JPT), Jun. 2013, pp. 126-128, vol. 65, No. 6.
Shin et al., "Review of Reservoir Parameters to Produce SAGD and Fast-SAGD Operating Conditions," Journal of Canadian Petroleum Technology (JCPT), Jan. 2007, pp. 35-41, vol. 46, No. 1.
English translation for China Application No. CN203905930U.
List of IBM Patents or Patent Applications Treated as Related.
N. Alali et al., "Neural Network Meta-Modeling of Steam Assisted Gravity Drainage Oil Recovery Processes," Iranian Journal of Chemistry & Chemical Engineering, vol. 29, No. 3, Sep. 2010, pp. 109-122.
C. Blundell et al., "Weight Uncertainty In Neural Networks," 2015, 10 pages.

* cited by examiner

100

300

400

600

700

800

CONTROLLING OPERATION OF A
STEAM-ASSISTED GRAVITY DRAINAGE
OIL WELL SYSTEM BY ADJUSTING
CONTROLS BASED ON FORECAST
EMULSION PRODUCTION

CROSS-REFERENCE TO RELATED
APPLICATIONS

The present application is related to commonly-assigned U.S. patent application Ser. No. 15/276,152, entitled "Controlling Operation of a Steam-Assisted Gravity Drainage Oil Well System Utilizing Continuous and Discrete Control Parameters," to commonly-assigned U.S. patent application Ser. No. 15/276,168, entitled "Controlling Operation of a Steam-Assisted Gravity Drainage Oil Well System by Adjusting Controls to Reduce Model Uncertainty," and to commonly-assigned U.S. patent application Ser. No. 15/276,178, entitled "Controlling Operation of a Steam-Assisted Gravity Drainage Oil Well System by Adjusting Multiple Time Step Controls," which are filed concurrently herewith and incorporated by reference herein.

BACKGROUND

The present application relates to operation, and more specifically, to controlling operation of a steam-assisted gravity drainage (SAGD) oil well system. SAGD is a shale oil production methodology. In a SAGD oil well system, also referred to herein as a SAGD system, steam is injected through one or more injector wells and oil is extracted through one or more producer wells. Generally, injector wells and producer wells are arranged in pairs. A group of such well pairs may be organized as a pad or SAGD production site, such as a pad including six well pairs.

SUMMARY

Embodiments of the invention provide techniques for modeling a SAGD oil well system and utilizing the model of the SAGD oil well system to adjust controls for the SAGD oil well system.

For example, in one embodiment, a method for increasing efficiency in emulsion production for a SAGD oil well system comprises generating a causal model of the SAGD oil well system and training the causal model of the SAGD oil well system utilizing historical time series data relating to one or more SAGD oil wells at one or more SAGD production sites of the SAGD oil well system. The historical time series data is obtained from a plurality of sensors in the SAGD oil well system. The method also comprises utilizing the causal model to determine a forecast emulsion production and a forecast set of control parameters associated with one or more of the SAGD production sites of the SAGD oil well system. The method further comprises adjusting a set of controls of the SAGD oil well system based on the forecast emulsion production and the forecast set of control parameters and subject to one or more constraints associated with the SAGD oil well system. The method is performed by at least one processing device comprising a processor coupled to a memory, the processing device being operatively coupled to the SAGD oil well system.

In another embodiment, a computer program product for increasing efficiency in emulsion production for a SAGD oil well system comprises a computer readable storage medium for storing computer readable program code. The computer readable program code, when executed, causes a computer to generate a causal model of the SAGD oil well system and to train the causal model of the SAGD oil well system utilizing historical time series data relating to one or more SAGD oil wells at one or more SAGD production sites of the SAGD oil well system. The historical time series data is obtained from a plurality of sensors in the SAGD oil well system. The computer readable program code, when executed, also causes the computer to utilize the causal model to determine a forecast emulsion production and a forecast set of control parameters associated with one or more of the SAGD production sites of the SAGD oil well system. The computer readable program code, when executed, further causes the computer to adjust a set of controls of the SAGD oil well system based on the forecast emulsion production and the forecast set of control parameters and subject to one or more constraints associated with the SAGD oil well system.

In another embodiment, an apparatus for increasing efficiency in emulsion production for a SAGD oil well system comprises a memory and a processor coupled to the memory. The processor is configured to generate a causal model of the SAGD oil well system and to train the causal model of the SAGD oil well system utilizing historical time series data relating to one or more SAGD oil wells at one or more SAGD production sites of the SAGD oil well system. The historical time series data is obtained from a plurality of sensors in the SAGD oil well system. The processor is also configured to utilize the causal model to determine a forecast emulsion production and a forecast set of control parameters associated with one or more of the SAGD production sites of the SAGD oil well system. The processor is further configured to adjust a set of controls of the SAGD oil well system based on the forecast emulsion production and the forecast set of control parameters and subject to one or more constraints associated with the SAGD oil well system.

DETAILED DESCRIPTION

Figure 1:
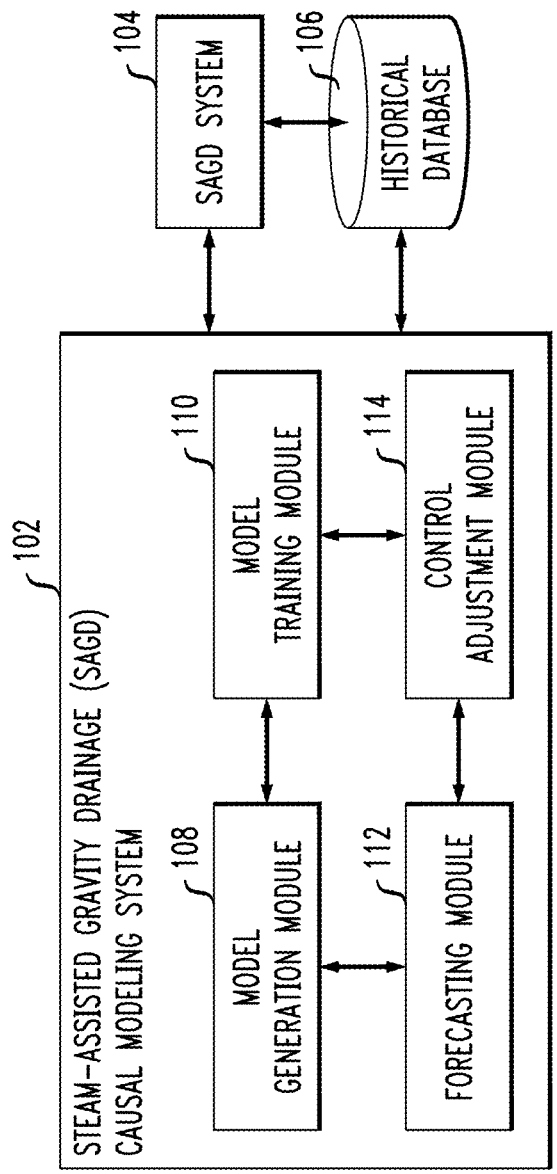
FIG. 1 depicts a system for controlling operation of a SAGD system by adjusting controls based on forecast emulsion production, according to an embodiment of the present invention.

Illustrative embodiments of the invention may be described herein in the context of illustrative methods, systems and devices for controlling operation of a SAGD oil well system to increase efficiency in emulsion production by adjusting controls of the SAGD system based on forecast emulsion production. However, it is to be understood that embodiments of the invention are not limited to the illustrative methods, systems and devices but instead are more broadly applicable to other suitable methods, systems and devices.

While various illustrative embodiments are described below in the context of a SAGD oil well system, embodiments are not necessarily limited solely to use with SAGD systems. Instead, the techniques described herein may be used for other types of oil production systems and other types of systems that may benefit from the use of physics-based predictive modeling.

SAGD, as mentioned above, is a non-conventional oil production methodology. SAGD refers to a method of extracting bitumen from oil sands. In some arrangements, steam is injected under pressure into one of two parallel horizontal wells, referred to herein as an injector well, to heat the surrounding earth. Heating the earth reduces a viscosity of the bitumen contained in the oil sands, allowing the bitumen to flow under gravity. The bitumen is heated until it flows through porous rock. As an example, it may take a few months to heat the earth to a sufficient temperature, such as 150° C., so that the bitumen will flow under gravity. The flow of bitumen and water condensate is collected and extracted from the other of the two parallel horizontal wells, referred to herein as a producer well. Generally, the producer well is lower or deeper in the earth relative to the injector well. Individual wells, such as the injector and/or producer well, may be slotted and/or valved to facilitate optimal extraction of bitumen from the oil sands.

The two parallel horizontal wells form a well pair. A SAGD production site or pad may include multiple well pairs. For example, a pad may be arranged as a square of concrete with six well pairs. A SAGD system may include multiple pads or production sites, as will be described in further detail below.

The proportion of bitumen in the emulsion for a given SAGD well pair will typically increase over time as the earth is heated. In some cases, a ratio of 2:1 between water and bitumen is considered a good ratio. Various factors may affect the emulsion rate and this ratio, including but not limited to the history of the well, temperature, porosity, the amount of bitumen in the surrounding earth, etc.

Operation of a SAGD system may involve several controls, including but not limited to the rate of steam injected, steam allocation to various sites and/or well pairs, gas casing pressure, extracted emulsion pressure, etc. The SAGD system may be instrumented with a number of sensors that provide at least partial information regarding a state of the SAGD system. Observables which may be measured using such sensors include but are not limited to emulsion rate, temperature profile along the length of a well, sub-cool profile, bottom hole pressure, gas blanket pressure, steam injection surface pressure, etc.

As one non-limiting example, consider a well pair in a SAGD system, wherein the surface pressure injection for the injector well is 2500 kiloPascals (kPa) for the casing and 3200 kPa for the tubing. The pressure will gradually be reduced as a steam chamber develops around the injector well. The bottom hole pressure of the injector well may be, for example, 2700 kPa, while the toe steam pressure in the injector well may by 2600 kPa. For the producer well, the bottom hole pressure may be 2600 kPa, with a tubing heel pressure of 2400 kPa and a tubing toe pressure of 2500 kPa. The surface production pressure, or the extracted emulsion pressure, may be in the range of 400-1000 kPa. The injector and producer wells of a well pair may have a horizontal length in the range of 500 to 1000 meters (m). The vertical distance between the injector and producer well may be approximately 5 m. The oil sands layer may begin 250 to 300 m or more from the surface. For example, a cap rock layer of shale and glacial till may range in thickness above the oil sands layer of the earth. The injector and producer well would thus have a vertical distance from the surface exceeding the thickness of the cap rock layer, which as mentioned above may be in the range of 250 to 300 m.

Costs in a SAGD system may be dominated by the cost of heating the steam relative to the amount of bitumen extracted. Greater steam injection rates generally increase the heat and amount of bitumen recovery, but are subject to constraints and in some cases diminishing returns. Such constraints include but are not limited to the need to keep the pressure in a well below the amount that would cause damage to the well or breach the overburden, avoiding conditions that would ingest steam into a producer well, etc.

A SAGD system may include a field with a number of production sites and many different well pairs. The SAGD system, however, will often have a finite amount of steam to distribute. The decision of how to best distribute the steam to different production sites and well pairs is an optimization problem. In some cases, a brokerage system may be used, where different well pairs or production sites provide estimates of the amount of bitumen that may be extracted day to day and steam is allocated based on such estimates.

A key challenge in SAGD operation is to determine an optimal set of controls that maximize or increase the yield of the system while honoring operational constraints. Maximizing or increasing yield may include maximizing or increasing emulsion rate, minimizing or reducing a cumulative steam to oil ratio in the emulsion, maximizing or increasing a net present value, etc. Operational constraints may include certain upper bounds on pressure such as bottom hole pressure, certain bounds on temperature such as minimum temperatures at different locations along injector and/or producer wells, sub-cool thresholds, etc.

Physics based predictive models may be difficult to generate in a cost-effective manner. For example, each well pair may be subject to different geology and bitumen environments. Thus, a detailed physical model of a well pair may require prescription of model parameters everywhere at all times, leading to great uncertainty. Physics based models may also require the prescription of a large number of "nuisance" parameters, such as porosity, permeability, heat coefficients throughout a field, etc. The nuisance parameters are so named to indicate that they are cost prohibitive or to indicate that there are no definitive means for determining such parameters in a real-world setting. As a consequence, ad-hoc or often generic values may be prescribed.

Such ad-hoc assignment of values may lead to biased predictions, as the values assigned may not properly distinguish the specific characteristics of individual wells, and therefore may fail to provide high fidelity results. In addition, some of the underlying multi-physics phenomena of SAGD systems are not fully realized thus further limiting the effectiveness of physics based predictive models. For example, the underlying physics of a SAGD system is complex, involving heat transfer (diffusion and advection), flow in a porous medium, various chemical processes, etc. Physics based predictive modeling may involve a number of simplifying assumptions that affect the accuracy of results. As an example, some models may treat well pairs as independent although this is not necessarily the case. Consider three well pairs arranged side by side. The left and right well pairs may be subject to more heating loss relative to the center well pair, which is shielded by the left and right well pairs. In addition, thermal communication between well pairs may result from channels through the rock or earth surrounding such well pairs.

Data driven or statistical approaches for modeling SAGD systems also suffer from disadvantages. For example, statistical methods may be agnostic to the underlying physical process, and thus their ability to offer reliable prediction is limited. In particular, as the underlying system is causal, a SAGD system is likely to respond differently to the same set of control inputs at different times. Such system behavior is difficult to model or cannot be modeled reliably, especially when little data is provided or available at an early stage of operation, in situations where values outside a training set are requested, or when long-term prediction is desired. In addition, statistical methods may require significant ramp-up time to accumulate sufficient data for training. Further, models may be tailored such that they are overly specific to one well pair and thus not generalizable to other well pairs.

Due to various limitations of standard predictive models in reliably predicting the response of a SAGD system for an extended duration, some optimization strategies may seek to prescribe a set of controls for optimizing production in just a single unit of time, such as for a single day. The subsurface dynamics of a SAGD system, as described above, may be of a complex multi-physics nature involving diffusion, advection, heat transfer, etc. that span across multi-scale time periods that extend beyond a single time unit such as a day. As such, there can be significant advantages in being able to choose parameters that maximize or increase emulsion production at minimum cost under various constraints that extend beyond a single time unit.

Some embodiments overcome one or more of these or other disadvantages to provide methods for modeling a SAGD system and for utilizing such modeling to adjust a set of controls for the SAGD system. In some embodiments, a causal model is provided that allows for determination of an optimal or improved set of controls, wherein the causal model links between a given set of controls and anticipated quantities of interest such as a subset of observable parameters of the SAGD system. One or more embodiments therefore meet the need for a predictive model that incorporates elements of the physical system, including causality and conservation of entities such as mass and energy, while adapting adequately to the individual characteristics of different well pairs as informed by the data. Some embodiments provide such a model that gives trustworthy predictions based on little historical data.

Using the techniques described herein, the selection of controls for SAGD system may be optimized or improved such that operation of the SAGD system may be controlled to increase the efficiency of emulsion production. Increasing the efficiency of emulsion production may include increasing emulsion output, reducing a water to oil or bitumen ratio of the emulsion, reducing an amount of steam required to achieve a given emulsion output, etc. Increased efficiency of emulsion production may be accounted for in the objectives used, further examples of which are described below.

In particular, some embodiments provide for forecasting of emulsion production in a SAGD system based on non-linear optimization and causal modeling using nonlinear autoregressive exogenous neural networks, feed-forward networks or other types of machine learning or neural networks including but not limited to a random forest classifier, a support vector classifier and a boosted support vector classifier. Some of these learning paradigms, such as random forest, provide an additional benefit of ranking control parameters according to their relative influence on output variables. In some embodiments, these rankings or other information may be used to identify the degree of cross coupling in well pairs. A nonlinear autoregressive exogenous model (NARX) neural network is utilized in some embodiments to forecast SAGD emulsion production based on time series historical sensor data obtained from SAGD well pairs.

The time series historical sensor data may include but is not limited to steam mass flow, temperature and pressure, emulsion mass flow, etc. The time series historical sensor data may also include data particular to one or both of the injector well and the producer well in a given well pair, such as temperature(s) along the lengths of such wells or at intervals thereof, information such as net injected energy, integrated or current injected energy, net mass flow, integrated or current mass flow, etc.

In some embodiments, sensor data including mass flows, temperature along well bores, pressure measurements, etc. are used in combination with a NARX neural network to model well behavior using a physics-inspired data-driven causal predictive model. State of the SAGD system is captured using non-linear autoregressive relations between input parameters with delay links between output quantities of interest and the input. The input parameters may include previous predictions, or functions of the previous predictions, previously-computed controls, etc. The quantities of interest are also referred to as predictions. Physics inspired input is also used to capture the state of the system. For example, mass and energy differentials as well as cumulative or integrated mass and energy balances are computed as input for each time step. The model is trained using historical data, such as time series historical data in the range of 2 to 5 days or more in some embodiments. The causal model is executed for a set of control input values under question, as well as transformed historic observables. The causal model is used for prediction purposes, such as in forecasting emulsion prediction and a set of control parameters or variables. The causal model may also be embedded in a prescriptive analytics framework to adjust controls for a SAGD system to meet one or more objectives, such as SAGD production optimization, sensitivity analysis, uncertainty quantification, etc. The use of NARX or other types of machine learning neural networks allows for feedback and internal states to improve predictions based on time series well data.

FIG. 1 shows a system 100, including a SAGD causal modeling system 102, SAGD oil well system 104 and historical database 106. Although not explicitly shown, the SAGD causal modeling system 102, SAGD system 104 and historical database 106 may be connected or operatively coupled to one another possibly via one or more networks. The SAGD causal modeling system 102 is configured to obtain sensor data from the SAGD system 104 and/or the historical database 106, and utilizes the sensor data to generate predictions in a model and to utilize such predictions to adjust controls of the SAGD system 104. Details regarding a possible implementation of SAGD system 104 will be discussed in further detail below with respect to FIG. 2.

SAGD causal modeling system 102 includes model generation module 108, model training module 110, forecasting module 112 and control adjustment module 114. The model generation module 108 is configured to generate a casual model of the SAGD system 104. The causal model may be, by way of example, a NARX model. In other embodiments, other types of machine learning or neural networks may be used, including feed forward neural networks and learning paradigms such as support vector, boosted support vector and random forest classifiers. Some of these learning paradigms, such as random forest, provide an additional benefit of ranking control parameters according to their relative influence on output variables. In some embodiments, these rankings or other information may be used to identify the degree of cross coupling in well pairs.

The model training module 110 is configured to train the causal model generated by model generation module 108 utilizing historical time series data relating to the SAGD system 104. As mentioned above, the historical time series data may be obtained by the SAGD causal modeling system 102 from the SAGD system 104 itself or via historical database 106. The historical time series data is gathered from a plurality of sensors in the SAGD system 104.

Forecasting module 112 is configured to utilize the causal model, generated by model generation module 108 and trained using model training module 110, to determine a forecast emulsion production and a forecast set of control parameters associated with the SAGD system 104. Control adjustment module 114 utilizes the forecast emulsion production and the forecast set of control parameters determined using the forecasting module 112 to adjust a set of controls of the SAGD system 104 subject to one or more constraints. In some embodiments, the control adjustment module 114 is configured to select an optimal or improved set of controls determined by an interior point optimization algorithm. The forecasting module 112 may utilize multiple iterations of generating forecast emulsion production using different forecast sets of control parameters.

While FIG. 1 shows a system 100 wherein the SAGD causal modeling system 102 is separate from the SAGD system 104, embodiments are not so limited. In some embodiments, the SAGD causal modeling system 102 may be incorporated in or otherwise be part of the SAGD system 104. The historical database 106 may also be incorporated at least in part in one or both of the SAGD causal modeling system 102 and SAGD system 104. Further, while system 100 shows SAGD causal modeling system 102 connected to a single SAGD system 104, embodiments are not so limited. A single instance of the SAGD causal modeling system 102 may be connected to or used to adjust controls of multiple distinct SAGD oil well systems in other embodiments. Also, while not explicitly shown in FIG. 1 the SAGD casual modeling system 102 may be part of a cloud computing environment or other processing platform, as will be discussed in further detail below with respect to FIGS. 10-12.

Figure 2:
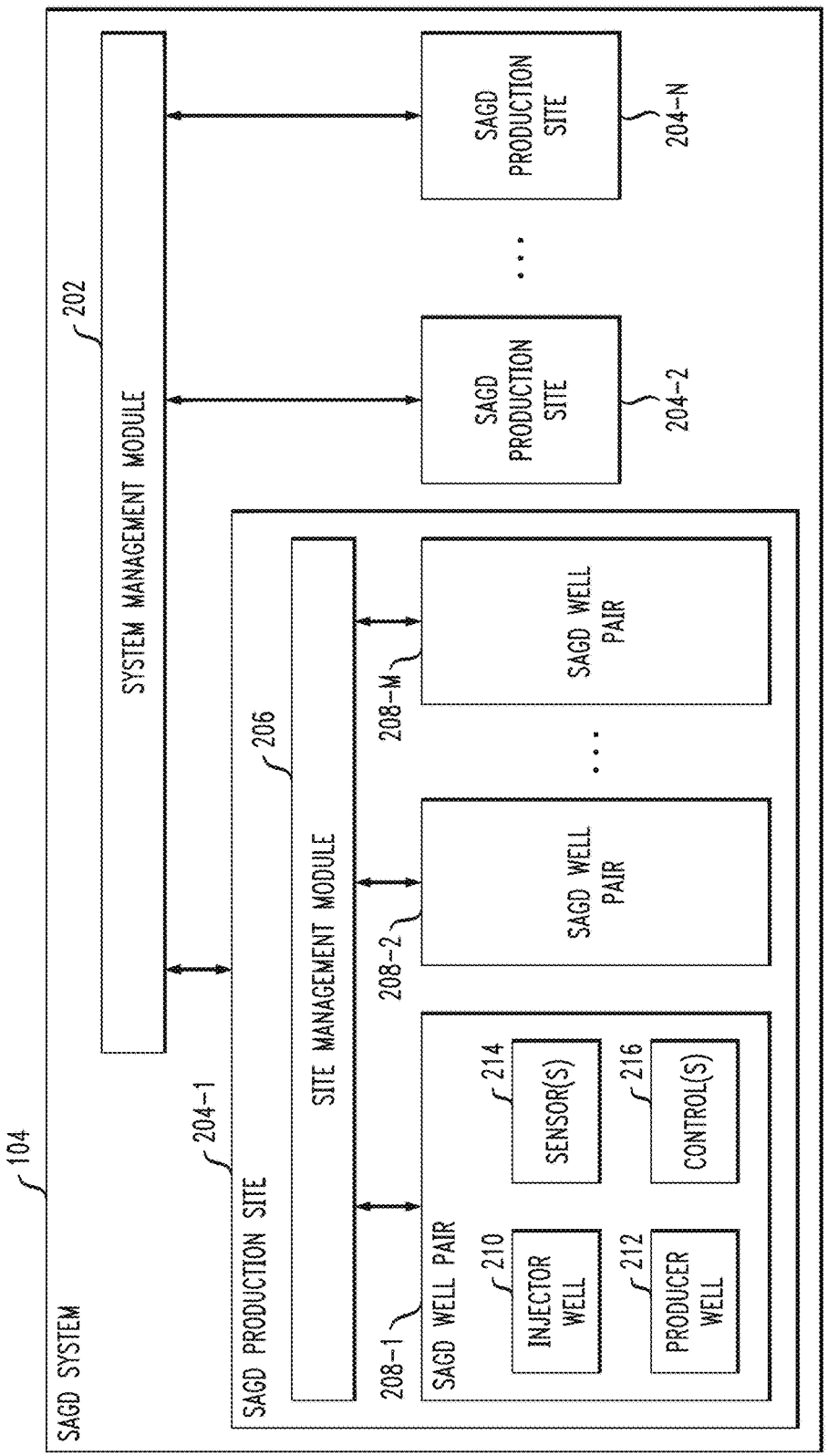
FIG. 2 depicts a detailed view of the SAGD system shown in FIG. 1, according to an embodiment of the present invention.

FIG. 2 shows a detailed view of an illustrative implementation of the SAGD system 104. As shown, the SAGD system 104 includes a system management module 202 and SAGD production sites 204-1, 204-2, . . . 204-N collectively referred to herein as SAGD production sites 204. The system management module 202 may receive control information from the SAGD casual modeling system 102, and utilize such information to set or adjust various controls at the SAGD production sites 204. Such controls may include, by way of example, steam allocation to different ones of the SAGD production sites 204. In some embodiments, the system management module 202 may incorporate or otherwise provide the functionality of the SAGD causal modeling system 102.

SAGD production site 204-1 includes a site management module 206 and SAGD well pairs 208-1, 208-2, . . . 208-M collectively referred to herein as SAGD well pairs 208. The site management module 206 may communicate with or receive control information from system management module 202, and utilizes such information to set or adjust controls at respective ones of the SAGD well pairs 208. It is to be appreciated that a particular SAGD system 104 may include only a single SAGD production site, such as SAGD production site 204-1. In these and other cases, the site management module 206 may incorporate or otherwise provide the functionality of the SAGD causal modeling system 102.

As shown in FIG. 2, SAGD well pair 208-1 includes an injector well 210, a producer well 212, one or more sensors 214 and one or more controls 216. The sensors 214 may be placed at various locations so as to collect information at least partially capturing a state of the SAGD well pair 208-1. Such information may be provided to the site management module 206 and on to system management module 202 for storage in historical database 106 and/or for use in SAGD causal modeling system 102. Sensors 214 may include temperature sensors, pressure sensors, sub-cool sensors, flow rate sensors, etc. Pressure sensors may take various forms, including bottom hole sensors, surface pressure sensors, blanket gas pressure sensors, etc. Temperature sensors may also take various forms, including thermocouples, fiber optics, distributed temperature systems (DTSs), etc. providing temperature readings across vertical and horizontal sections of a well. A DTS can provide temperature readings at intervals (e.g., one meter) along injector and producer legs of a well pair. Pressure sensors may be fewer in number relative to temperature sensors, and may be located at strategic points to measure observables of interest mentioned above. The relative numbers of temperature and pressure sensors, however, may various as desired and it is not a requirement that temperature sensors outnumber pressure sensors.

The controls 216 are adjusted based on instructions or information received from the SAGD causal modeling system 102 via site management module 206 and system management module 202. Controls 216 may include valves to control the flow of steam in injector well 210 or the rate of emulsion flow from producer well 212, the pressure of injected steam, the rate at which emulsion is pumped, the emulsion pressure, the temperature of the injected steam, the allocation of injected steam to different parts of a well (e.g., heel vs. toe), etc. Valves may be manually or automatically actuated in different embodiments. Controls 216 may also include mass flow controllers, pumps, etc. In some embodiments, each well pair is controlled by a set of five continuous control variables or parameters and one discrete control variable or parameter. The continuous control parameters may include, for a given well pair, the heel steam rate, toe steam rate, heel lift gas flow, toe lift gas flow and emulsion pressure. The discrete control parameter for the given well pair may indicate whether the well is active or inactive.

Although not explicitly shown in FIG. 2, other ones of the well pairs 208 may be configured with an injector well, producer well, sensors and controls in a manner similar to that described above with respect to well pair 208-1. Also, although not explicitly shown in FIG. 2 other ones of the SAGD production sites may be configured with site management modules and SAGD well pairs in a manner similar to that described above with respect to SAGD production site 204-1. Further, while FIG. 2 shows an arrangement in which the SAGD system 104 includes sensors that are local to individual SAGD well pairs, embodiments are not so limited. In some cases, SAGD production site 204-1 may include one or more sensors that collect information common to multiple ones of the SAGD well pairs 208. In a similar manner, the SAGD system 104 may include one or more sensors that collect information common to multiple ones of the SAGD production sites 204.

In some embodiments, physics inspired values are used to express the state of a given one of the SAGD well pairs 208, a given one of the SAGD production sites 204 or the SAGD system 104 at any given time. Such physics inspired values include but are not limited to steam mass flow, temperature and pressure, emulsion mass flow and temperature, temperature along injector and producers legs of a well pair (at intervals thereof or selected regions of interest), net injected energy, integrated energy, net mass, integrated net mass, etc. This information may be used in generating a model of the SAGD system 104, where the model comprises or otherwise utilizes one or more machine learning algorithms including but not limited to autoregressive neural networks, feedforward neural networks, random forest classifiers, support vector machines and boosted support vector machines. The autoregressive neural network or other model is trained and utilized to predict one or more future states of the SAGD system 104 from historical time series data, where the state of the SAGD system 104 is expressed in terms of one or more of the aforementioned variables or other variables described herein.

In some embodiments, NARX is used as a nonlinear autoregressive model with exogenous inputs. NARX may be used to relate current values of a time series so as to predict past values of the time series and current and past values of the driving or exogenous inputs. In this context, the exogenous inputs are an externally determined series that affects or otherwise influences the time series of interest. NARX may utilize an error term to account for the fact that knowledge of certain variables does not necessarily enable the current value of the time series to be predicted perfectly. Algebraically, the NARX algorithm may be expressed as follows:

$$q(t_i)=F(q(t_{i-1}),q(t_{i-2}),q(t_{i-3}),\ldots,o(t_i),o(t_{i-1}),o(t_{i-2}),o(t_{i-2}),\ldots c(t_i),c(t_{i-1}),c(t_{i-2}),c(t_{i-2}),\ldots)+\varepsilon(t_i)$$

where q represents the variable of interest, o denotes the observable parameters and c denotes the controls. Collectively, o and c may be considered externally determined variables. In this case, information about o and c helps predict q, as do previously-computed values of q. $\varepsilon$ represents the error term or noise.

The parameters of the NARX model may be achieved by training using back propagation or other regressive methods such as Bayesian Regression with respect to the historical training data. The equation above, although described with respect to a NARX model, is a superset that also includes feed-forward networks. Though not specified in the equation above, it is further understood that the neural network in some embodiments utilizes one or more fully connected hidden layers containing neurons with activation functions. The activation function(s) may be selected from a set of known activation functions. In some embodiments, hyperbolic tangent functions are used as the activation functions. In other embodiments, other types of activation functions may be used including but not limited to radial basis functions, linear functions, Elliot sigmoid functions, etc. including combinations of such activation functions in multiple hidden layers. The neural network may be trained on large amounts of data, e.g., many hundreds of days of data. Embodiments, however, are not so limited and may be used in cases where the training data set is smaller, such as 2-5 days or more. Performance, however, will generally benefit from the use of more training data.

Figure 3:
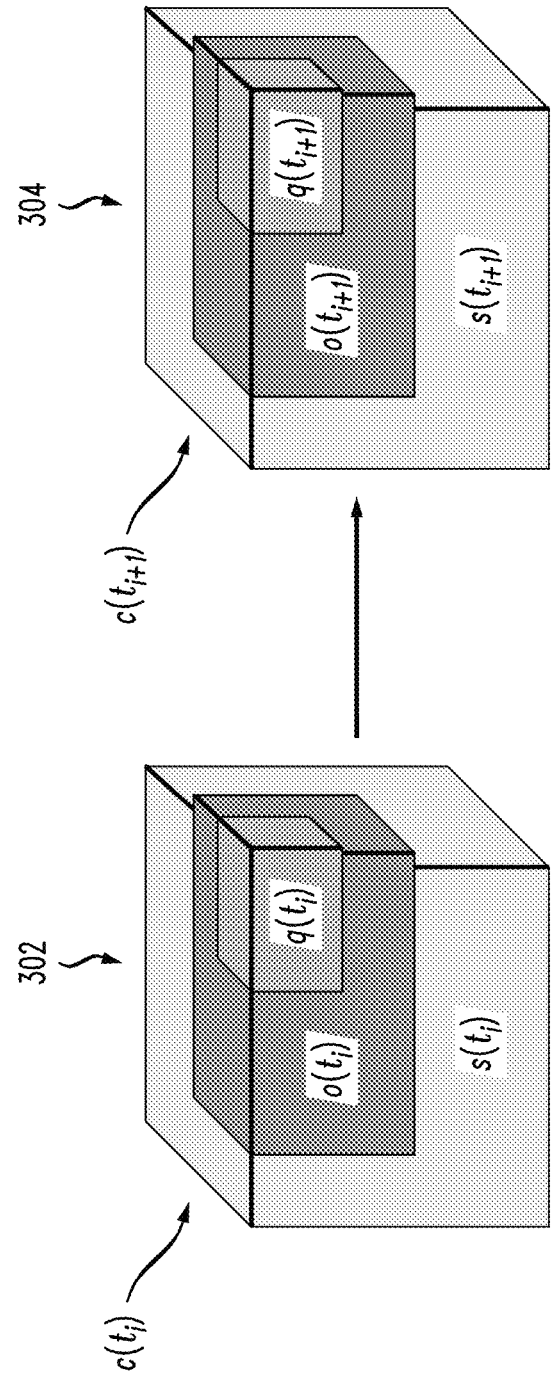
FIG. 3 depicts state transition for a SAGD system, according to an embodiment of the present invention.

FIG. 3 depicts a state transition 300 of SAGD system 104 between a first state 302 and a second state 304. It is assumed, for the purposes of modeling, that the SAGD system 104 may be represented in state space form, where $s(t_i)$ represents the state of the SAGD system 104 at time $t_i$, $o(t_i)$ represents the observables of the SAGD system 104 at time $t_i$, $c(t_i)$ represents the controls applied on the SAGD system 104 at time $t_i$, and $q(t_i)$ indicates the quantities of interest at time $t_i$. Observables may include but are not limited to emulsion rate, temperature readings at various locations, pressure readings at various locations, etc. Controls may include but are not limited to steam rate, casing gas pressure, etc. Quantities of interest may include but are not limited to emulsion rate, temperature, pressure and composition. The modeling objective can be stated or considered as predicting future observables at time $t_{i+1}$, e.g., $o(t_{i+1})$, given the observables $o(t_i)$ and controls $c(t_i)$ at time $t_i$.

The causal nature of the underlying physics of the SAGD system 104 may be accommodated in various ways. In some embodiments, model observables and output (e.g., emulsion production) are fed back to the causal model as input in an auto-regressive fashion. Input parameters, such as controls, feedback and other parameters of relevance, may be introduced to the causal model with a set of delays. The delays specify a time range, or how far back previous values are of relevance to the SAGD system 104. In some embodiments, delays are set to 2:5 representing a model that is fed with 2 to 5 days of back data or historical time series data at any time step instance. It is to be appreciated, however, that embodiments are not limited to use with 2 to 5 days of historical time series data. In other embodiments, more or less historical time series data may be utilized.

Input parameters for the causal model are transformed into physics inspired entities that can approximate the state of SAGD system 104. For example, mass and energy differentials as well as cumulative mass and energy balances are computed as input at each time step.

NARX neural networks used in some embodiments can learn to predict a time series in a causal form. The NARX neural network takes, as input, physics inspired past values of a time series, feedback input and external or exogenous time series. The physics inspired past values represent modified observables, and may include parameters such as mass differential, cumulative mass differential, energy differential cumulative energy differential, etc. The feedback input represents the quantities of interest, and may include parameters such as emulsion rate. The external or exogenous times series represents the controls for the SAGD system 104.

Figure 4:
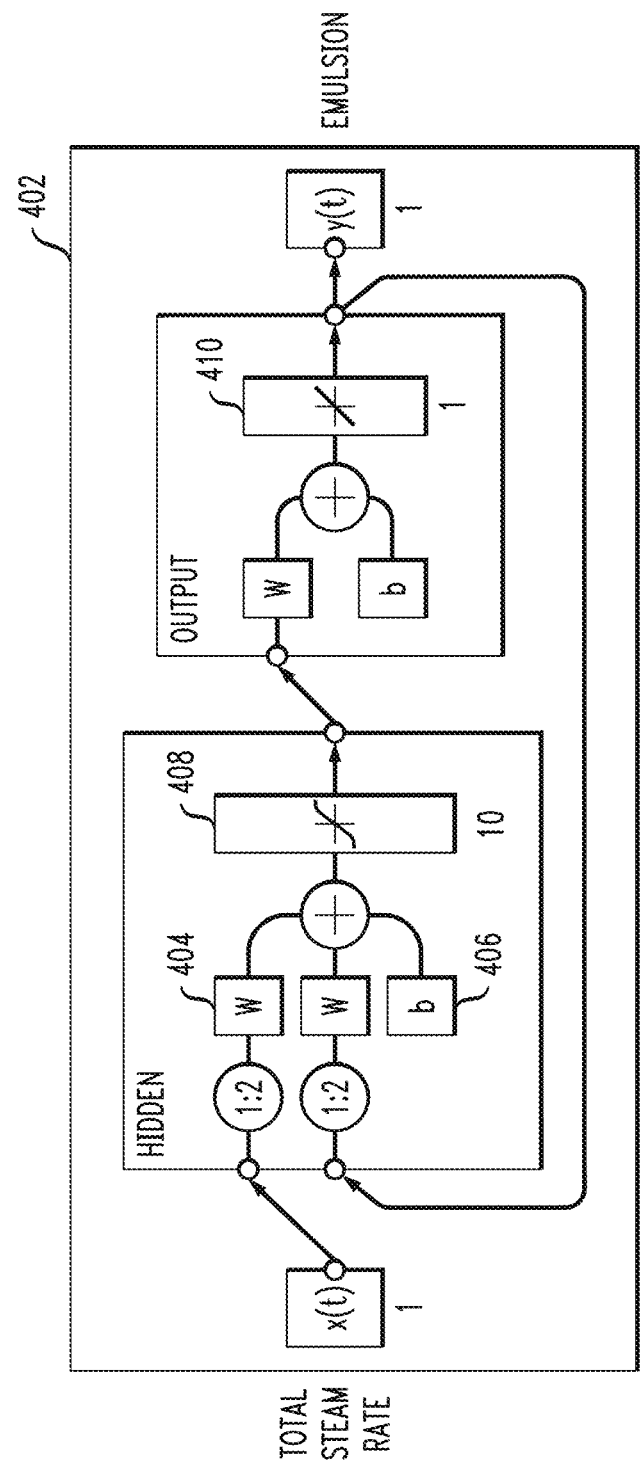
FIG. 4 depicts a visualization of an auto regressive non-linear neural network for forecasting emulsion production in a SAGD system, according to an embodiment of the present invention.

FIG. 4 depicts a visualization 400 of a NARX neural network 402 which may be used to forecast emulsion production in SAGD system 104. As shown, the NARX neural network 402 takes as input the total steam rate, and provides as output the emulsion rate. In this visualization, x(t) represents the input and y(t) represents the output. The NARX neural network 402 utilizes a hidden layer with 10 neurons, and an output layer with one neuron as there is one output. As shown, the output is fed back as an input to the hidden layer. The output and exogenous input (e.g., total steam rate) in the hidden layer are weighted with weights 404 w and summed with bias 406 b. The delay links are shown as 1:2 for both the exogenous input and the output that is fed back to the hidden layer. The hidden layer also includes an activation function 408. The output layer similarly includes weights and biases and an activation function 410. As will be described in further detail below with respect to FIGS. 5 and 6, it is possible to train multiple outputs in a neural network. In some cases, however, performance may be improved by restricting the output to a single variable as shown in FIG. 4.

The state of the SAGD system 104 can evolve over time, and may depend on the cumulative energy and mass inserted and exerted to the SAGD system 104. To account for these quantities in addition to raw controls and observables, physical entities including integrated total mass inserted, integrated total energy inserted, mass differential and energy differential may be approximated and fed as input to the predictive model and/or simulator. The integrated total mass inserted is a measure of the integrated amount of steam inserted to the SAGD system 104 over some defined time period. The integrated total energy inserted is a measure which may be computed as the product of the inserted steam multiplied by the computed inwards enthalpy of the steam over some defined time period. The mass differential is a measure of the emulsion flow subtracted from the total injected steam, and the energy differential is a measure of the integrated approximated energy differential over the life of a well, e.g., as a product of the outwards enthalpy of the extracted emulsion subtracted from a product of the inserted mass and the inward enthalpy of the steam. These inputs can be processed using neural network software to produce an executable neural network function for each output variable.

Figure 5:
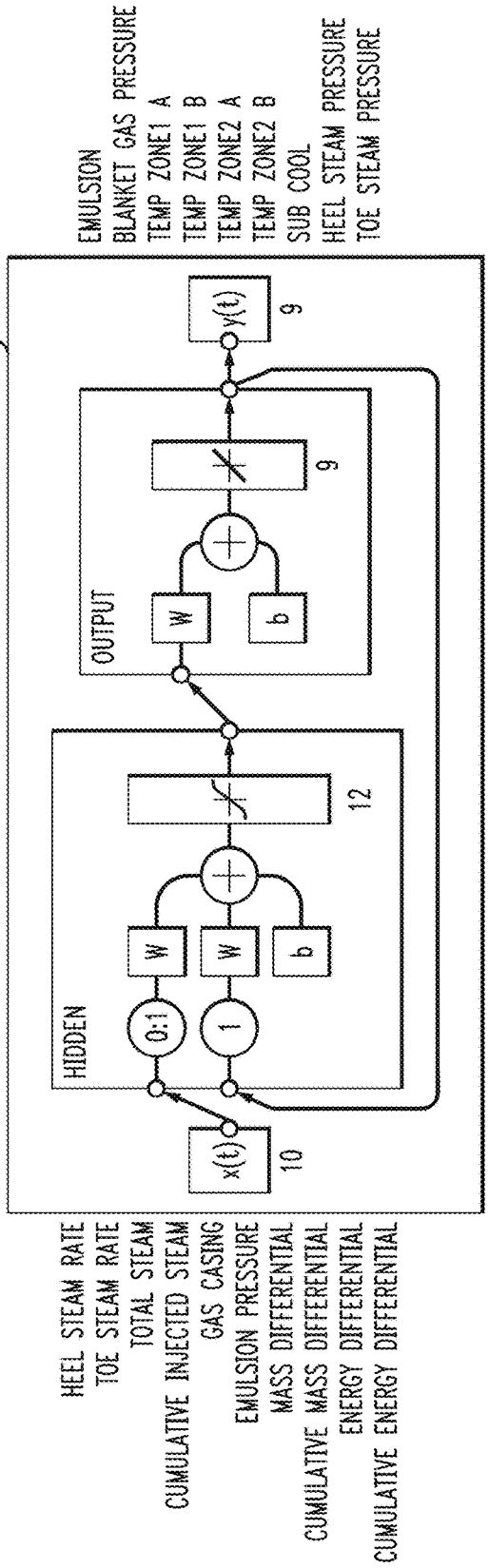
FIG. 5 depicts a visualization of an auto regressive non-liner neural network for forecasting emulsion production and other variables in a SAGD system, according to an embodiment of the present invention.

Modeling of the SAGD system 104 may involve heterogeneous sources of information, and thus may benefit from the use of a heterogeneous set of output parameters. Thus, in some embodiments a multiple outputs and inputs neural network may be used. FIG. 5 depicts a visualization 500 of a NARX neural network 502 which uses multiple inputs and outputs. As shown, there are ten inputs: heel steam rate; toe steam rate; cumulative injected steam (as measured from some defined start time); gas casing pressure; emulsion pressure; mass differential; cumulative mass differential; energy differential; and cumulative energy differential.

The heel steam rate and toe steam rate may be associated with a producer well or injector well at a particular SAGD well pair of a SAGD production site. The total steam rate and cumulative injected steam may refer to a SAGD production site, a SAGD well pair at a particular SAGD production site, etc. The gas casing pressure may be with reference to a producer well or injector well at a particular SAGD well pair of a SAGD production site. The emulsion pressure input may be with respect to a producer well at a particular SAGD well pair, or may refer to a group of producer wells at a given SAGD production site or SAGD production sites.

The current mass differential may be measured as a difference between material input at an injector well (e.g., steam) and material output of a producer well (e.g., emulsion) for a particular SAGD well pair at a point in time, or possibly for a group of SAGD well pairs at one or more SAGD production sites at a point in time. The cumulative mass differential or integrated total mass inserted, as described above, may be a measure of the difference between the material input at an injector well (e.g., steam) and the material output of a producer well (e.g., emulsion) for a particular SAGD well pair for a defined time period, or possibly for a group of SAGD well pairs at one or more SAGD production sites for a defined time period. The integrated total energy inserted, as described above, may be a measure of the energy of the material input at an injector well (e.g., steam) for a particular SAGD well pair for a defined time period, or possibly for a group of SAGD well pairs at one or more SAGD production sites for a defined time period.

The energy differential may be a measure of a difference between the energy of material added at an injector well (e.g., the enthalpy of steam added) and material output at a producer well (e.g., the enthalpy of the emulsion) for a particular SAGD well pair at a point in time, or possibly for a group of SAGD well pairs at one or more SAGD production sites at a point in time. The cumulative energy differential may be a measure of the difference between the energy of material added at an injector well (e.g., the enthalpy of steam added) and the energy of material output at a producer well (e.g., the enthalpy of the emulsion) for a particular SAGD well pair for a defined time period, or possibly for a group of SAGD well pairs at one or more SAGD production sites for a defined time period.

The NARX neural network 502 has nine outputs: emulsion rate; blanket gas pressure; temperature zone1 A; temperature zone1 B; temperature zone2 A; temperature zone2 B; sub-cool; heel steam pressure; and toe steam pressure. The emulsion rate may be an output rate for a particular SAGD well pair, for a group of SAGD well pairs at one or more SAGD production sites, etc. The blanket gas pressure may be for an injector well of a particular SAGD well pair.

The outputs relating to temperature are divided into zones 1 and 2, and further into outputs A and B. Zones 1 and 2 may refer to temperature readings at particular points in a SAGD production site, a particular SAGD well pair, along the length of an injector well or producer well of a particular SAGD well pair, etc. Zones 1 and 2 may also utilize multiple temperature readings for a section or portion of the injector well or producer well of a particular SAGD well pair, or for particular sections or portions of a SAGD well pair or SAGD production site, etc. The values A and B may indicate different values for the respective zones. For example, the values A and B may indicate maximum and minimum temperatures, respectively, or the mean temperature and deviation, respectively, etc. At a given SAGD well pair, or SAGD production site, there may be hundreds or thousands of temperature measurements taken at different locations. The number of outputs relating to temperature may vary as desired for a particular implementation, such as using one zone or more than two zones. In a similar manner, the numbers of other inputs and outputs used may vary, such as for example using multiple different pressure readings for different zones or locations, etc.

The sub-cool output may be measured for a particular SAGD well pair, for a group of two or more SAGD well pairs at one or more SAGD production sites, etc. Temperature and pressure readings may be used to compute enthalpy of the output of a producer well to determine if the emulsion output is in a gas or liquid phase. The sub-cool level or threshold gives a degree or margin to prevent ingestion of steam into the producer well. Negative sub-cool refers to a situation in which the enthalpy of the emulsion is less than the enthalpy of steam, and has adverse effects such as the ingestion of sand or gravel into the producer well. A sub-cool level or threshold may be set to 10 degrees or more in some embodiments, but is more generally set so as to obtain as much bitumen in the emulsion output without ingesting sand, gravel or other undesirable particulates into the producer well.

Heel and toe steam pressure outputs may be measured for a producer well at a particular SAGD well pair.

In one embodiment, the NARX neural network 502 utilizes a hidden layer with 12 neurons, and an output layer with 9 neurons, one for each output. As shown, the outputs are fed back as input to the hidden layer. The outputs and exogenous inputs are weighted with weights w and summed with biases b. In other embodiments, a separate network is trained for each output (i.e. the output of each network is restricted to one variable). As described above, the use of separate networks for each output may provide advantages in certain cases.

SAGD system 104 may be complex with nonlinear subsurface dynamics. As such, in some embodiments there is a delicate balance between model fidelity and complexity. Complexity may be introduced to a NARX neural network by enrichment of the causal model. The causal model may be enriched in a number of ways, including but not limited to using a richer set of activation functions or kernels, inclusion of more neurons in the model, and the introduction of additional hidden layers to form a deep neural network, also referred to as deep learning.

Figure 6:
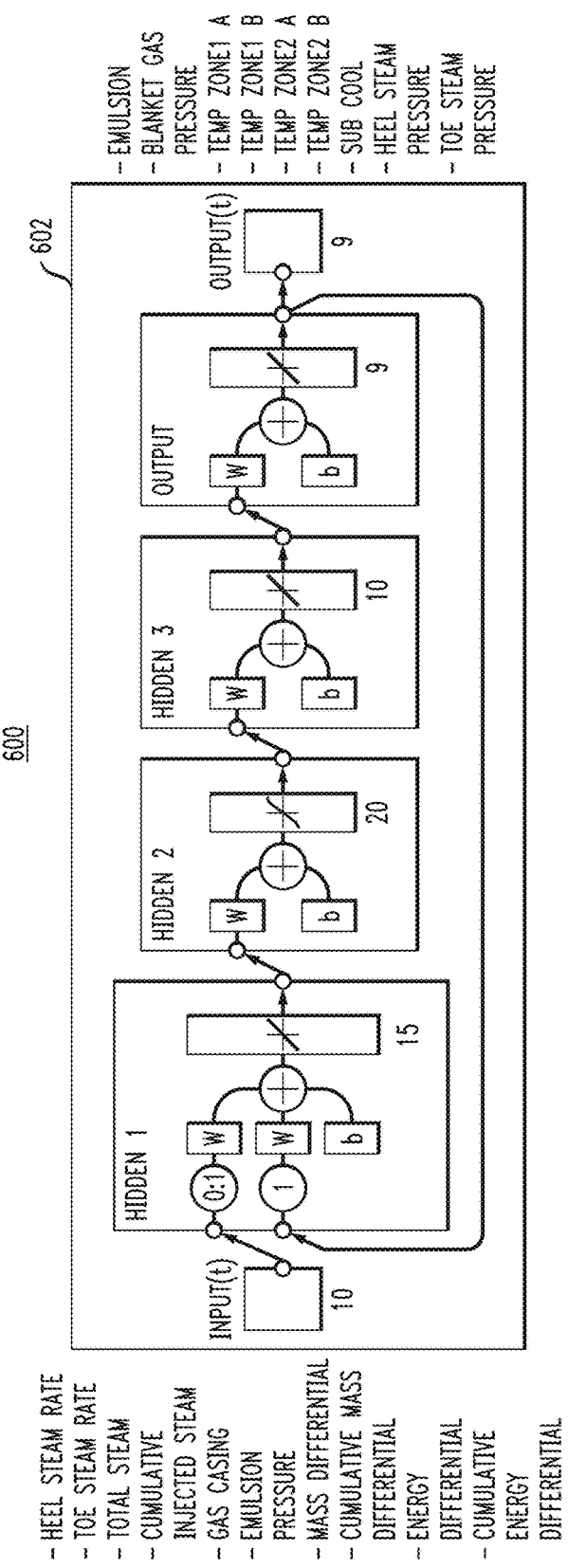
FIG. 6 depicts another visualization of an auto regressive non-liner neural network for forecasting emulsion production and other variables in a SAGD system with multiple hidden layers, according to an embodiment of the present invention.

FIG. 6 depicts a visualization 600 of a NARX neural network 602 with such enrichments. The NARX neural network 602, in this example, uses the same inputs and outputs as the NARX neural network 502, though this is not a requirement. The NARX neural network 602 includes a richer set of activation functions or kernels relative to NARX neural networks 402 and 502 shown in FIGS. 4 and 5. The NARX neural network 602 also utilizes three hidden layers, with the first hidden layer having 15 neurons (as compared with 12 neurons in the hidden layer of NARX neural network 502), a second hidden layer with 20 neurons, and a third hidden layer with 9 neurons.

It should be noted that the NARX neural networks shown in FIGS. 4-6 are presented by way of example, and that embodiments are not limited solely to use with the particular numbers or types of inputs, outputs, hidden layers, weights, delay links, numbers of neurons, etc.

Figure 7:
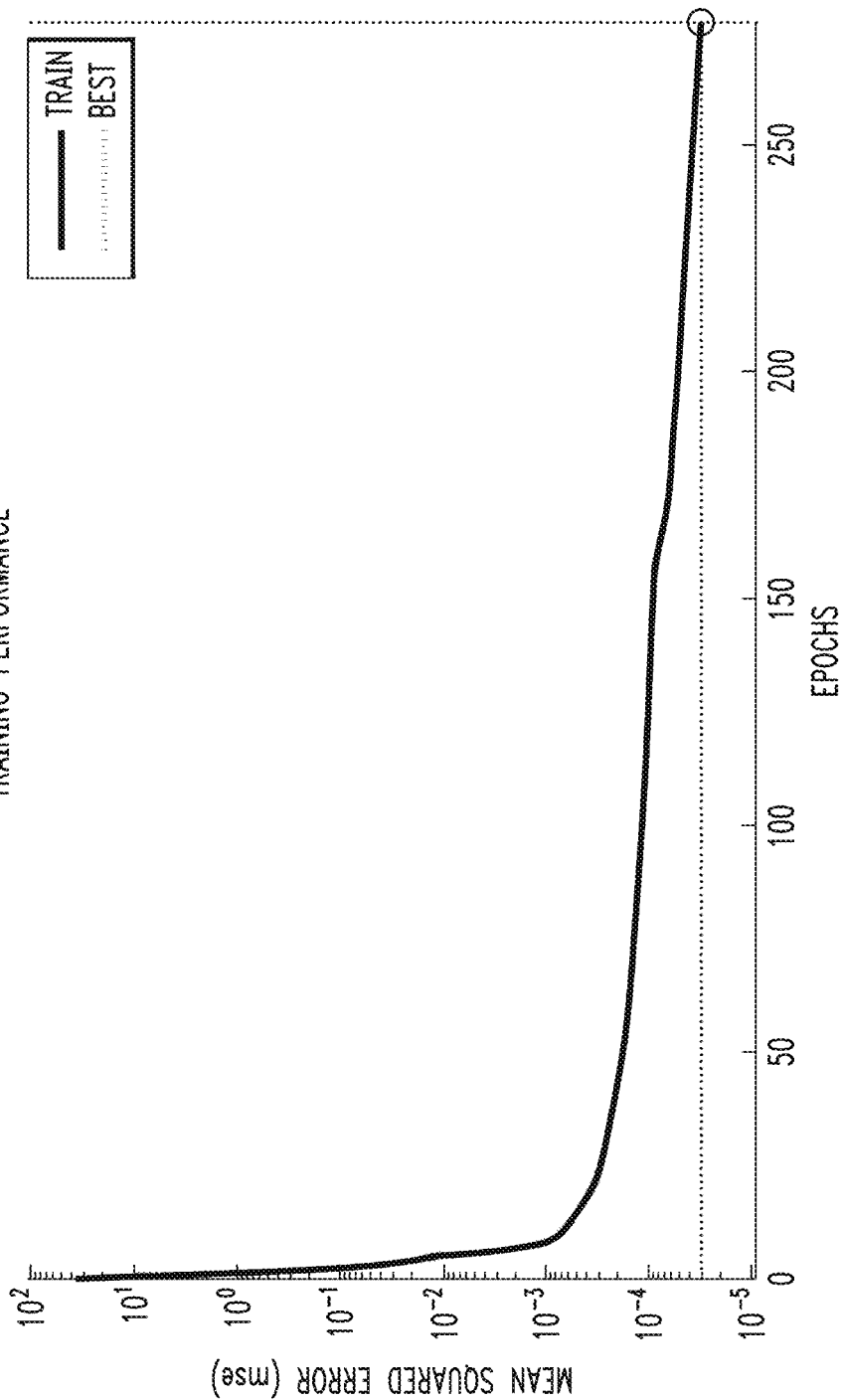
FIG. 7 depicts a plot illustrating training of a causal model, according to an embodiment of the present invention.

The models used in some embodiments undergo training. During training, weights w and biases b described above with respect to FIGS. 4-6 are determined so as to minimize the discrepancy between model prediction and the actual values of the input and output parameters of the historical time series data. FIG. 7 shows a plot 700 of a convergence graph, illustrating the capability of the causal model to reduce the discrepancy between predicted and observed values during training.

Figure 8:
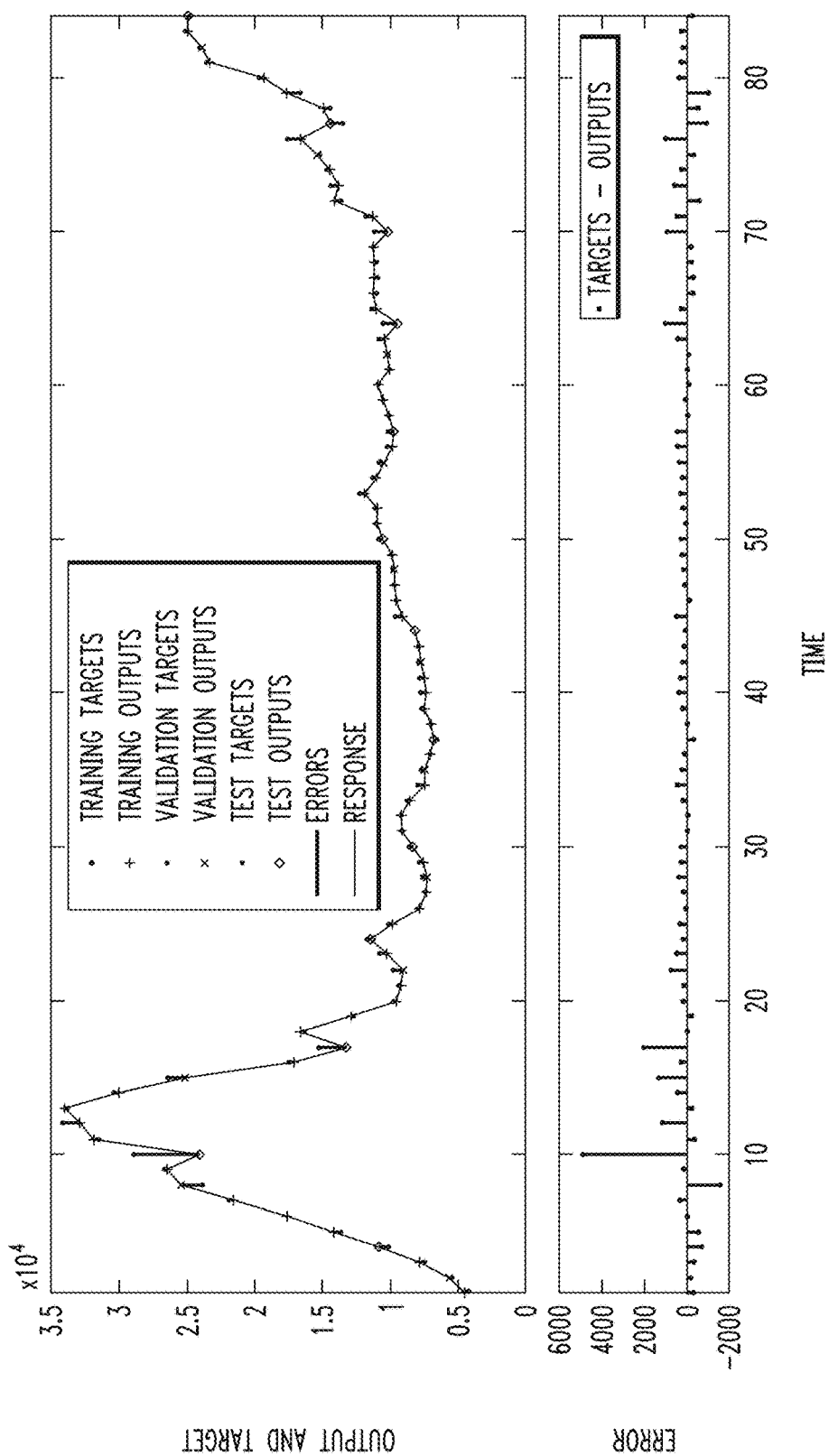
FIG. 8 depicts a plot illustrating model validation, according to an embodiment of the present invention.

Following training, the causal model can be utilized for predictive and/or prescriptive purposes as described elsewhere herein. Due to the causal aspect of the model, training, validation and testing sets may be interlaced to avoid the causal relevancy becoming too remote. FIG. 8 shows a plot 800 illustrating validation of the causal model using sample data.

Objectives may include but are not limited to increasing or maximizing emulsion production, decreasing or minimizing a steam to oil ratio, increasing or maximizing a net present value, etc. An objective may also be framed in the context of a constraint, such as meeting a threshold oil or emulsion production using as little steam as possible.

Constraints may include but are not limited to various pressure and temperature maximums and minimums at various locations in the SAGD system 104, threshold sub-cool levels, etc. Constraints may take various forms, such as non-linear inequality constraints, bound constraints, etc. Non-linear inequality constraints may include, for example:

0≤injector BHP (or blanket gas pressure)≤1740 kPa gauge
min(temperature)≥45° Celsius (C.)
std(temperature$^{zone}$)≤15° C.
mean(sub-cool)≥5° C.

The min(temperature) constraint may refer to the minimum temperature of a particular well section or sections. Each well in a well pair may be divided into two main sections—a vertical length and a horizontal length. Each section may be further subdivided into zones as described above. Temperature may be measured along the well in each of the zones. Sub-cool temperature measurements may also be taken across zones of the horizontal section of the producer well. The sub-cool measurement, as described above, involves the difference between the producer bottom hole temperature and the saturated steam temperature at the injector bottom hole pressure. The temperature$^{zone}$ constraint may refer to the temperature at an injector well or producer well for some defined length, and std refers to standard deviation. The temperature uniformity across horizontal zonal length (e.g., for a particular portion of an injector or producer well) may also or alternatively be incorporated as a regularizer. The sub-cool constraint may be in the form of a mean or average, and sets the threshold sub-cool level.

Bound constraints may include, for example:

0≤steam injection surface pressure≤3900 kPa gauge
max($c_{hsr}^{lb}$, 0)≤heel steam rate≤max($c_{hsr}^{ub}$, 0)
max($c_{tsr}^{lb}$, 0)≤toe steam rate≤max($c_{tsr}^{ub}$, 0)
max($c_{cgp}^{lb}$, 0)≤casing gas pressure≤max($c_{cgp}^{ub}$, 0)
max($c_{ep}^{lb}$, 0)≤emulsion pressure≤max($c_{ep}^{ub}$, 0)

$c_{hsr}^{lb}$ is the minimum or lower bound of the historical heel steam rate, $c_{hsr}^{ub}$ is the maximum or upper bound of the historical heel steam rate, $c_{tsr}^{lb}$ is the minimum or lower bound of the historical toe steam rate, $c_{tsr}^{ub}$ is the maximum or upper bound of the historical toe steam rate, $c_{cpg}^{lb}$ is the minimum or lower bound of the historical casing gas pressure, $c_{cgp}^{ub}$ is the maximum or upper bound of the historical casing gas pressure, $c_{ep}^{lb}$ is the minimum or lower bound of the historical emulsion pressure, and $c_{ep}^{ub}$ is the maximum or upper bound of the historical emulsion pressure.

It is to be appreciated that the specific values and numbers used in the above-described constraints are presented by way of example only, and that embodiments are not limited solely to use with the specific numbers and/or ranges given or to use with the specific example constraints described.

The control variables or parameters may include continuous and discrete variables. Continuous control variables may include heel steam rate, toe steam rate, heel lift gas flow, toe lift gas flow and emulsion pressure. Discrete control variables may include binary on/off decisions concerning well choices and whether to open valves.

It is to be appreciated that while various examples of objectives, constraints and controls are described above and used in the example below, embodiments are not limited solely to use with these specific objectives, constraints and controls.

Constraints of the SAGD system 104 may be associated with state of the SAGD system 104 rather than control parameters, and can thus be encoded as non-linear constraints rather than simple bounds. Some simple bounds may be implicit. For example, pressure and steam rates should be nonnegative.

Figure 9:
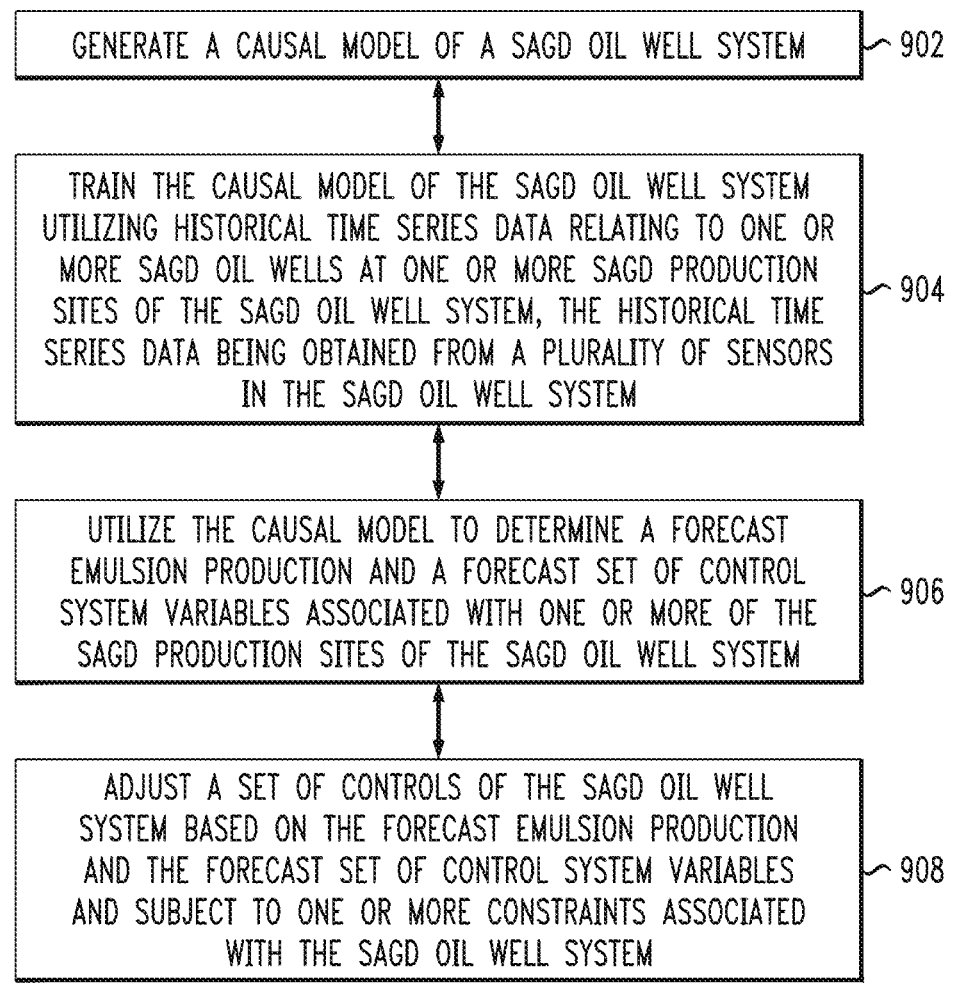
FIG. 9 depicts a process for adjusting controls in a SAGD system, according to an embodiment of the invention.

FIG. 9 shows a process 900 for adjusting controls in a SAGD system, such as SAGD system 104. SAGD causal modeling system 102 may be used to implement process 900. The process 900 begins with step 902, generating a causal model of a SAGD oil well system such as SAGD system 104. In some embodiments, the causal model may comprise a machine learning model utilizing a set of inputs, a set of outputs and at least one hidden layer. The machine learning model may comprise a NARX or other type of neural network or feed-forward model, a random forest classifier, a support vector classifier, a boosted support vector classifier, etc.

Possible inputs and outputs for the causal model are described above with respect to the visualizations of NARX neural networks 402, 502 and 602 in FIGS. 4-6. For example, the set of inputs may include two or more of a heel steam rate of a given producer well of a given one of the SAGD productions sites 204, a toe steam rate of the given producer well, a total steam rate at the given SAGD production site, a cumulative injected steam at a given injector well of the given SAGD production site, a gas casing pressure at the given producer well, an emulsion pressure output of the given producer well, a current mass differential between input at the given injector well and output of the given producer well at a given point in time, a cumulative mass differential between input at the given injector well and output of the given producer for a given time period, an energy differential between material added at the given injector well and material output at the given producer well at the given point in time, a cumulative energy differential between material added at the given injector well and material output at the given producer well for the given time period. The set of outputs may include two or more of an emulsion output rate at a given SAGD production site, a blanket gas pressure of a given injector well at the given SAGD production site, one or more temperature variables associated with one or more temperature zones at the given SAGD production site, a sub-cool of the given SAGD production site, a heel steam pressure of a given producer well at the given SAGD production site, and a toe steam pressure of the given producer well at the given SAGD production site.

The causal model may be configured to compute nonlinear autoregressive relations between a set of input parameters, the model having delay links between a set of output parameters and the set of input parameters, the set of input parameters comprising an input set of control parameters and one or more previously-computed sets of input parameters, the previously-computed sets of input parameters being generated using the model based on corresponding previously-computed sets of output parameters. In some embodiments, step 902 includes obtaining a set of observable parameters capturing a state of the SAGD system 104 from a plurality of sensors in the SAGD system 104, where the set of observable parameters forms at least a portion of the set of input parameters.

The process 900 continues with step 904, training the causal model of the SAGD system 104 utilizing historical time series data relating to one or more SAGD oil wells such as SAGD well pairs 208 at one or more SAGD production sites 204 of the SAGD system 104. The historical time series data may be obtained at least in part from a plurality of sensors in the SAGD system, such as the sensors 214 in SAGD well pair 208-1. The historical time series data may, in some embodiments, include at least 2-5 days of historical data relating to one or more SAGD oil wells in the SAGD system 104. In other embodiments, more or less than 2 to 5 days of historical time series data may be used.

In step 906, the causal model is utilized to determine a forecast emulsion production and a forecast set of control parameters associated with one or more of the SAGD production sites 208 of the SAGD system 104. The forecast emulsion production and forecast set of control parameters are used in step 908 to adjust a set of controls of the SAGD system 104, such as the controls 216 of SAGD well pair 208-1 at SAGD production site 204-1, subject to one or more constraints associated with SAGD system 104 or a portion thereof. In some embodiments, the set of controls comprises respective rates of steam allocated to injector wells of SAGD well pairs 208 at one or more SAGD production sites 204 in the SAGD system 104. The set of controls may alternately or additionally include allocation of steam between injector wells at two or more different SAGD well pairs 208 at SAGD production site 204-1, steam allocation between two or more different SAGD productions sites 204 in SAGD system 104, etc. The set of controls may also or alternatively include a gas casing pressure and/or extracted emulsion pressure associated with one or more of the SAGD well pairs 208 and/or one or more of the SAGD production sites 204 in SAGD system 104.

Step 908 involves adjusting the controls of the SAGD system 104 subject to one or more constraints associated with the SAGD system 104. The one or more constraints may include one or more threshold pressures or temperatures associated with one or more injector or producer wells at one or more SAGD well pairs 208 at one or more SAGD productions sites 204 in the SAGD system 104. The constraints may also or alternatively include a threshold sub-cool level associated with one or more SAGD well pairs 208, one or more SAGD production sites 204, and/or the SAGD system 104. In some cases, different threshold temperatures, pressures, sub-cool levels, etc. may vary between different injector or producer wells, between different SAGD well pairs, or between different SAGD production sites. In addition, various other types of constraints may be used in addition to or in place of one or more of the above-described constraints, including but not limited to minimum and maximum steam allocations to SAGD well pairs or SAGD production sites, constraints designed to avoid blowing overburden, various other safety constraints, etc.

In some embodiments, step 908 involves adjusting the controls of the SAGD system 104 based on achieving one or more objectives subject to the one or more constraints. The objectives may vary as desired for a particular application. Such objectives include but are not limited to increasing emulsion yield of the SAGD system 104, reducing a cumulative steam to oil ratio of the SAGD system 104, increasing a net present value of the SAGD system 104, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
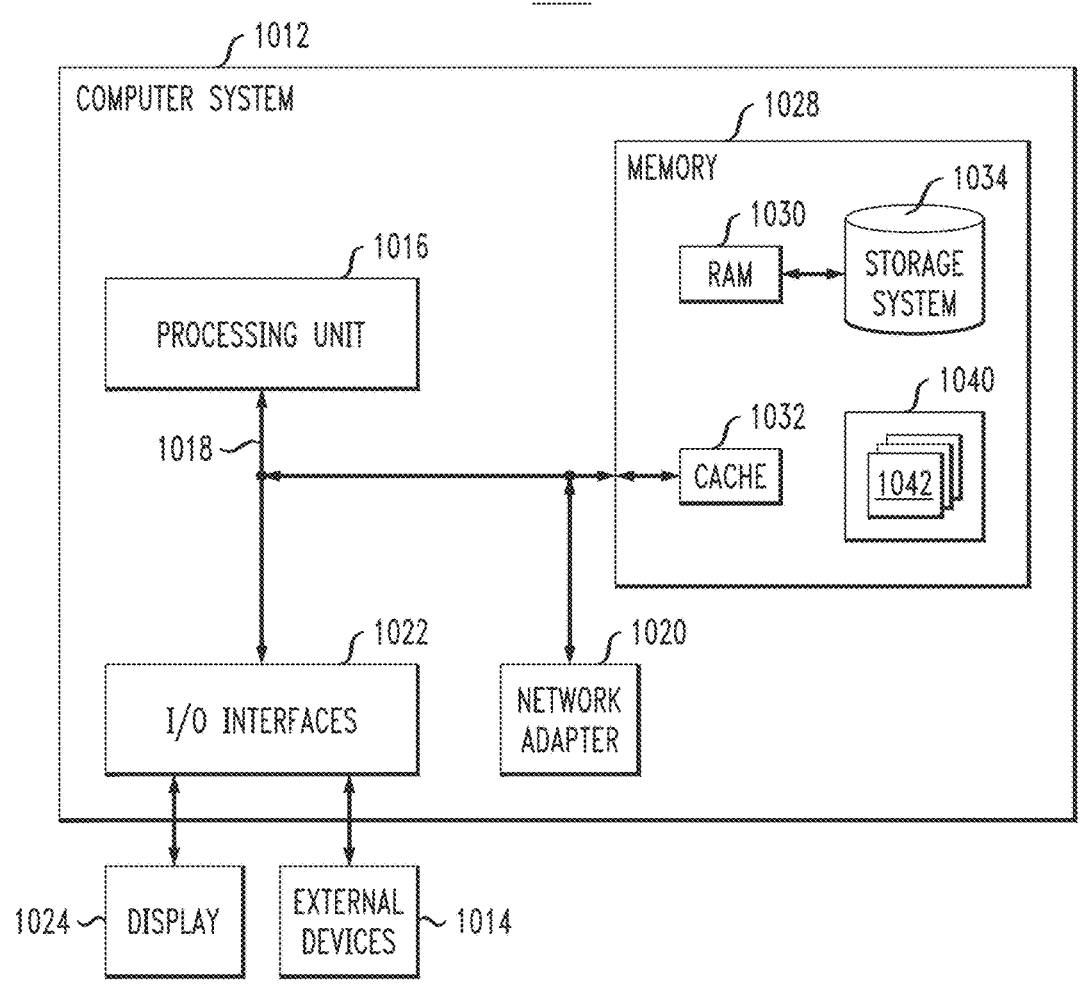
FIG. 10 depicts a computer system in accordance with which one or more components/steps of techniques of the invention may be implemented, according to an embodiment of the invention.

One or more embodiments can make use of software running on a general-purpose computer or workstation. With reference to FIG. 10, in a computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

The bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1012 typically includes a variety of computer system readable media. Such media may be any available media that is accessible by computer system/server 1012, and it includes both volatile and non-volatile media, removable and non-removable media.

The system memory 1028 can include computer system readable media in the form of volatile memory, such as random access memory (RAM) 1030 and/or cache memory 1032. The computer system/server 1012 may further include other removable/non-removable, volatile/nonvolatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1018 by one or more data media interfaces. As depicted and described herein, the memory 1028 may include at least one program product having a set (e.g., at least one) of program modules that are configured to carry out the functions of embodiments of the invention. A program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc., one or more devices that enable a user to interact with computer system/server 1012, and/or any devices (e.g., network card, modem, etc.) that enable computer system/server 1012 to communicate with one or more other computing devices. Such communication can occur via I/O interfaces 1022. Still yet, computer system/server 1012 can communicate with one or more networks such as a LAN, a general WAN, and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
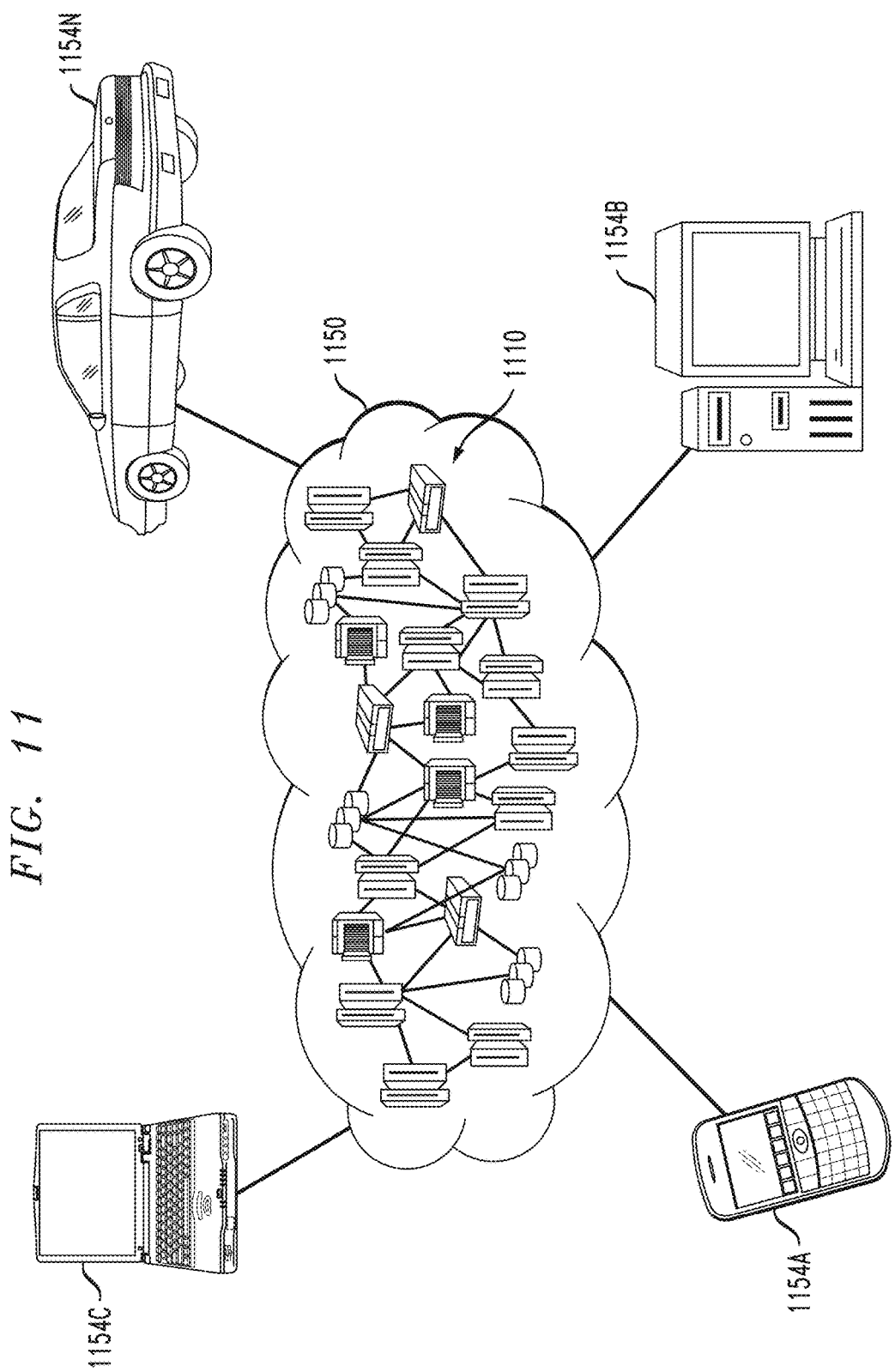
FIG. 11 depicts a cloud computing environment, according to an embodiment of the present invention.

Referring now to FIG. 11, illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
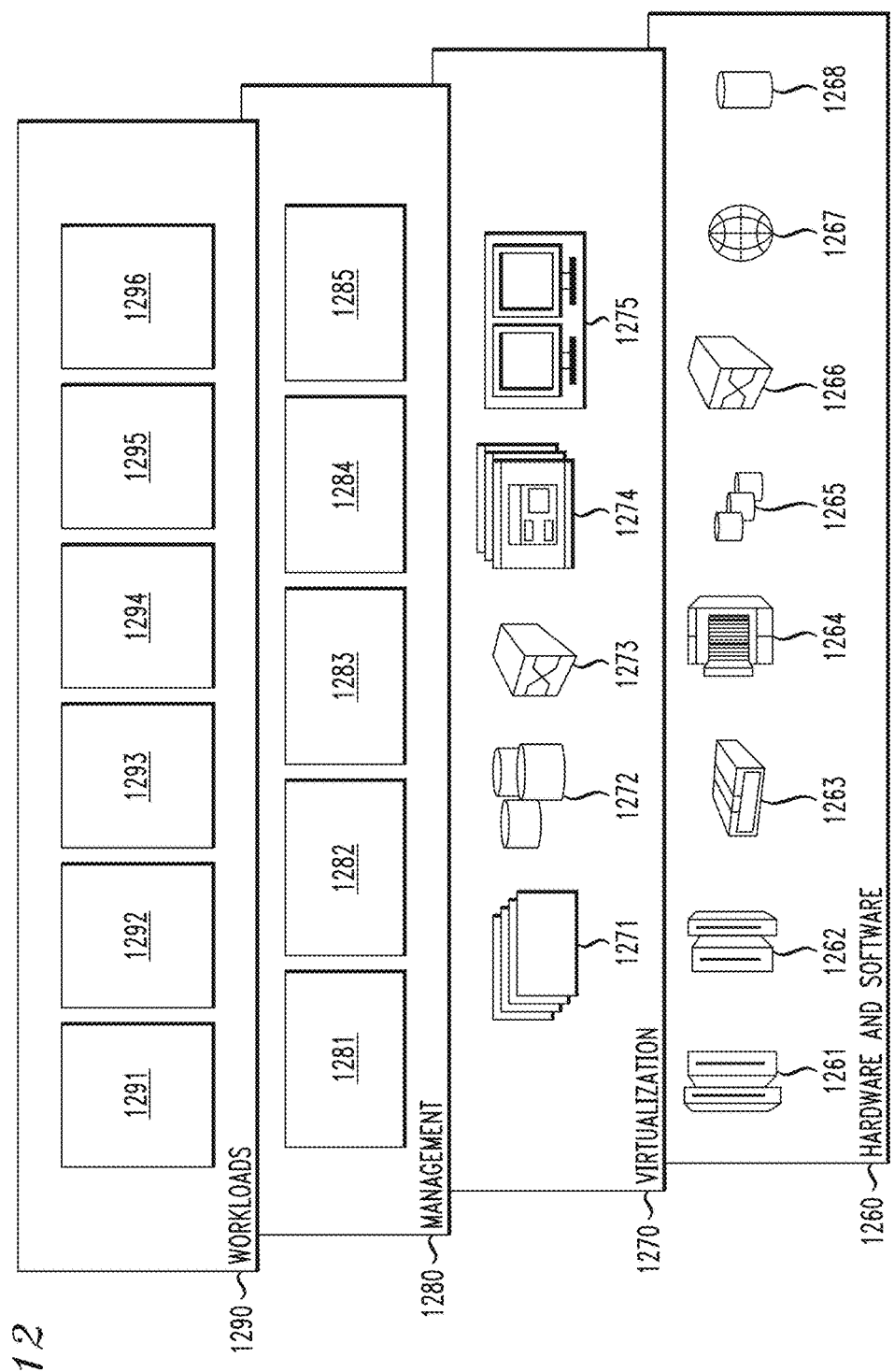
FIG. 12 depicts abstraction model layers, according to an embodiment of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and SAGD causal modeling 1296, which may perform various functions described above with respect to SAGD causal modeling system 102.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for increasing efficiency in emulsion production for a steam-assisted gravity drainage (SAGD) oil well system comprising:
a memory; and
a processor coupled to the memory and configured:
to generate a causal model of the SAGD oil well system;
to train the causal model of the SAGD oil well system utilizing historical time series data relating to one or more SAGD oil wells at one or more SAGD production sites of the SAGD oil well system, the historical time series data being obtained from a plurality of sensors in the SAGD oil well system;
to utilize the causal model to determine a forecast emulsion production and a forecast set of control parameters associated with one or more of the SAGD production sites of the SAGD oil well system for a given time step, the forecast set of control parameters comprising respective amounts of steam allocated to the one or more SAGD production sites of the SAGD oil well system; and
to adjust a set of controls of the SAGD oil well system based on the forecast emulsion production and the forecast set of control parameters and subject to one or more constraints associated with the SAGD oil well system;
to operate the SAGD oil well system utilizing the adjusted set of controls;
to collect data from the plurality of sensors in the SAGD oil well system while operating the SAGD oil well system utilizing the adjusted set of controls; and
to refine the causal model of the SAGD oil well system utilizing the collected data from the plurality of sensors in the SAGD oil well system;
wherein the utilizing, adjusting, operating, collecting and refining are repeated for multiple time steps;
wherein the causal model comprises a machine learning model utilizing a set of input parameters, a set of output parameters and at least one hidden layer; and
wherein the machine learning model comprises a neural network model comprising a nonlinear autoregressive exogenous model.

2. The apparatus of claim 1, wherein the nonlinear autoregressive exogenous model is configured to compute nonlinear autoregressive relations between the set of input parameters, the nonlinear autoregressive exogenous model having delay links between the set of output parameters and the set of input parameters, the set of input parameters comprising an input set of control parameters and one or more previously-computed sets of input parameters, the previously-computed sets of input parameters being generated using the nonlinear autoregressive exogenous model based on corresponding previously-computed sets of output parameters.

3. A computer program product for increasing efficiency in emulsion production for a steam-assisted gravity drainage (SAGD) oil well system comprising a computer readable storage medium for storing computer readable program code which, when executed, causes a computer:
to generate a causal model of the SAGD oil well system;
to train the causal model of the SAGD oil well system utilizing historical time series data relating to one or more SAGD oil wells at one or more SAGD production sites of the SAGD oil well system, the historical time series data being obtained from a plurality of sensors in the SAGD oil well system;
to utilize the causal model to determine a forecast emulsion production and a forecast set of control parameters associated with one or more of the SAGD production sites of the SAGD oil well system for a given time step, the forecast set of control parameters comprising respective amounts of steam allocated to the one or more SAGD production sites of the SAGD oil well system; and
to adjust a set of controls of the SAGD oil well system based on the forecast emulsion production and the forecast set of control parameters and subject to one or more constraints associated with the SAGD oil well system;
to operate the SAGD oil well system utilizing the adjusted set of controls;
to collect data from the plurality of sensors in the SAGD oil well system while operating the SAGD oil well system utilizing the adjusted set of controls; and
to refine the causal model of the SAGD oil well system utilizing the collected data from the plurality of sensors in the SAGD oil well system;
wherein the utilizing, adjusting, operating, collecting and refining are repeated for multiple time steps;
wherein the causal model comprises a machine learning model utilizing a set of input parameters, a set of output parameters and at least one hidden layer; and
wherein the machine learning model comprises a neural network model comprising a nonlinear autoregressive exogenous model.

4. The computer program product of claim 3, wherein the nonlinear autoregressive exogenous model is configured to compute nonlinear autoregressive relations between the set of input parameters, the nonlinear autoregressive exogenous model having delay links between the set of output parameters and the set of input parameters, the set of input parameters comprising an input set of control parameters and one or more previously-computed sets of input parameters, the previously-computed sets of input parameters being generated using the nonlinear autoregressive exogenous model based on corresponding previously-computed sets of output parameters.

5. A method for increasing efficiency in emulsion production for a steam-assisted gravity drainage (SAGD) oil well system comprising:
generating a causal model of the SAGD oil well system;
training the causal model of the SAGD oil well system utilizing historical time series data relating to one or more SAGD oil wells at one or more SAGD production sites of the SAGD oil well system, the historical time series data being obtained from a plurality of sensors in the SAGD oil well system;
utilizing the causal model to determine a forecast emulsion production and a forecast set of control parameters associated with one or more of the SAGD production sites of the SAGD oil well system for a given time step, the forecast set of control parameters comprising respective amounts of steam allocated to the one or more SAGD production sites of the SAGD oil well system; and
adjusting a set of controls of the SAGD oil well system based on the forecast emulsion production and the forecast set of control parameters and subject to one or more constraints associated with the SAGD oil well system;

operating the SAGD oil well system utilizing the adjusted set of controls;

collecting data from the plurality of sensors in the SAGD oil well system while operating the SAGD oil well system utilizing the adjusted set of controls; and refining the causal model of the SAGD oil well system utilizing the collected data from the plurality of sensors in the SAGD oil well system;

wherein the utilizing, adjusting, operating, collecting and refining steps are repeated for multiple time steps;

wherein the causal model comprises a machine learning model utilizing a set of input parameters, a set of output parameters and at least one hidden layer;

wherein the machine learning model comprises a neural network model comprising a nonlinear autoregressive exogenous model; and wherein the method is performed by at least one processing device comprising a processor coupled to a memory, the processing device being operatively coupled to the SAGD oil well system.

6. The method of claim 1, wherein the machine learning model comprises a neural network model comprising a feed-forward neural network model.

7. The method of claim 1, wherein the machine learning model comprises at least one of a neural network, a random forest classifier, a support vector classifier and a boosted support vector classifier.

8. The method of claim 1, wherein the set of inputs comprises two or more of:
   a heel steam rate of a given producer well of a given one of the SAGD productions sites;
   a toe steam rate of the given producer well;
   a total steam rate at the given SAGD production site;
   a cumulative injected steam at a given injector well of the given SAGD production site;
   a gas casing pressure at the given producer well;
   an emulsion pressure output of the given producer well;
   a current mass differential between input at the given injector well and output of the given producer well at a given point in time;
   a cumulative mass differential between input at the given injector well and output of the given producer for a given time period;
   an energy differential between material added at the given injector well and material output at the given producer well at the given point in time;
   a cumulative energy differential between material added at the given injector well and material output at the given producer well for the given time period.

9. The method of claim 1, wherein the set of outputs comprises two or more of:
   an emulsion output rate at a given SAGD production site;
   a blanket gas pressure of a given injector well at the given SAGD production site;
   one or more temperature variables associated with one or more temperature zones at the given SAGD production site;
   a sub-cool of the given SAGD production site;
   a heel steam pressure of a given producer well at the given SAGD production site; and
   a toe steam pressure of the given producer well at the given SAGD production site.

10. The method of claim 1, wherein the nonlinear autoregressive exogenous model is configured to compute nonlinear autoregressive relations between the set of input parameters, the nonlinear autoregressive exogenous model having delay links between the set of output parameters and the set of input parameters, the set of input parameters comprising an input set of control parameters and one or more previously-computed sets of input parameters, the previously-computed sets of input parameters being generated using the nonlinear autoregressive exogenous model based on corresponding previously-computed sets of output parameters.

11. The method of claim 10, further comprising obtaining a set of observable parameters capturing a state of the SAGD oil well system from the plurality of sensors in the SAGD oil well system, wherein the set of observable parameters forms at least a portion of the set of input parameters.

12. The method of claim 1, wherein the set of controls comprises respective rates of steam allocated to injector wells of one or more SAGD well pairs at one or more of the SAGD productions sites in the SAGD oil well system.

13. The method of claim 1, wherein the set of controls comprises allocation of steam between at least one of:
   two or more different SAGD production sites in the SAGD oil well system; and
   two or more different injectors wells at two or more different SAGD well pairs at a given SAGD production site in the SAGD oil well system.

14. The method of claim 1, wherein the set of controls comprises at least one of:
   a gas casing pressure at one or more of the SAGD production sites in the SAGD oil well system; and
   an extracted emulsion pressure at one or more producer wells of one or more of the SAGD production sites in the SAGD oil well system.

15. The method of claim 1, wherein the one or more constraints comprise at least one of:
   at least one threshold pressure for a given one of the SAGD production sites in the SAGD oil well system;
   at least one threshold temperature at the given SAGD production site in the SAGD oil well system; and
   a threshold sub-cool level at a given one of the SAGD production sites in the SAGD oil well system.

16. The method of claim 1, wherein adjusting the set of controls of the SAGD oil well system is based on achieving one or more objectives subject to the one or more constraints.

17. The method of claim 16, wherein adjusting the set of controls comprises selecting a set of controls determined by an interior point optimization algorithm.

18. The method of claim 16, wherein the one or more objectives comprise increasing emulsion yield of the SAGD oil well system.

19. The method of claim 16, wherein the one or more objectives comprise reducing a cumulative steam to oil ratio of the SAGD oil well system.

20. The method of claim 16, wherein the one or more objectives comprises increasing a net present value of the SAGD oil well system.

* * * * *